United States Patent [19]

Terada et al.

[11] Patent Number: 4,497,000

[45] Date of Patent: Jan. 29, 1985

[54] MAGNETIC RECORDING/REPRODUCING APPARATUS

[75] Inventors: Toshimichi Terada, Chigasaki; Keiichi Komatsu; Akira Shibata, both of Katsuta; Kenji Satoh, Yokohama, all of Japan

[73] Assignee: Hitachi, Ltd., Tokyo, Japan

[21] Appl. No.: 471,129

[22] Filed: Mar. 1, 1983

[30] Foreign Application Priority Data

Mar. 3, 1982 [JP] Japan .................. 57-32452

[51] Int. Cl.³ .............................................. G11B 5/55
[52] U.S. Cl. ........................................ 360/70; 360/77
[58] Field of Search ................... 360/10.2, 70, 77

[56] References Cited

U.S. PATENT DOCUMENTS

| | | | |
|---|---|---|---|
| 4,247,741 | 1/1981 | Tatsuguchi et al. | 369/43 |
| 4,297,733 | 10/1981 | Sanderson | 360/77 |
| 4,364,097 | 12/1982 | DeBoer et al. | 360/70 |
| 4,414,586 | 11/1983 | Hirota et al. | 360/70 |

Primary Examiner—George G. Stellar
Attorney, Agent, or Firm—Antonelli, Terry & Wands

[57] ABSTRACT

A magnetic recording/reproducing apparatus for sequentially recording each of four pilot signals of different frequencies on each video track to be multiplexed with a video signal and reproducing the video signal and the pilot signals at which time the pilot signals are separated from the video signal and used as a tracking signal to control the transport speed of the magnetic tape, wherein upon reproduction the levels of the pilot signals reproduced from the right and left adjacent video tracks are detected and one of the reproduced pilot signals from the right and left adjacent tracks is controlled in its level so that the tape travelling speed is controlled to make the center of the video head scan the same position on the track as upon recording.

4 Claims, 15 Drawing Figures

MAGNETIC RECORDING/REPRODUCING APPARATUS

This invention relates to a magnetic recording/reproducing apparatus for recording a color video signal on a magnetic tape and reproducing the color video signal from the magnetic tape, and particularly to one in which a control signal for controlling the travelling speed of the magnetic tape is recorded on the video tracks on the magnetic tape together with the video signal and upon reproduction, the control signal is used to control the travelling speed of the magnetic tape, preventing the heads from scanning out of tracks.

In the magnetic recording/reproducing apparatus for recording on a magnetic tape a color television broadcast program or a video signal produced from a television camera, and for reproducing it therefrom, the video signal is recorded slantwise on the magnetic tape with respect to its longitudinal direction by slantwise wrapping the magnetic tape on a cylindrical drum while the tape is being travelled and by scanning the magnetic tape with the video heads which are rotating along the outer peripheral surface of the cylinder. Thus, the video-signal recorded tracks are formed on the magnetic tape at an angle to the longitudinal direction of the tape upon reproduction, the video heads must scan the video-signal recorded tracks (video tracks) precisely. This becomes important in the case where two video heads are used of which the magnetic gaps are at opposite azimuth angles, and the two video heads are rotated to alternately scan the video tracks in turn to record a video signal on the tape. That is, upon reproduction, it is necessary to reproduce the video signal by the video heads of the same azimuth angles as upon recording. If the video heads of opposite azimuth angles to those upon recording were used to scan the tracks upon reproduction, the video signal would be too attenuated due to azimuth loss to be reproduced. Therefore, upon reproduction, the rotating speed and phase of the video heads and the travelling speed and phase of the magnetic tape must be controlled so that the video heads scan the same video tracks as upon recording, to effect correct tracking. In the past, this tracking control was achieved by the control signal recorded on the control track. Recently, pilot signals are tried to be used instead of the control signal to be frequency-multiplexed with the video signal on the video tracks, from which, upon reproduction, the pilot signals are reproduced as control signals to achieve tracking control.

In this method, four pilot signals of different frequencies are formed and each pilot signal is recorded on each video track to be frequency-multiplexed with the video signal, while upon reproduction the pilot signals are separated from the reproduced signal from the video heads, and the reproduction levels of the pilot signals of the adjacent tracks are decided on the basis of the separated pilot signal to detect tracking error, thereby controlling the travelling speed of the magnetic tape.

According to this tracking method, since the pilot signals are reproduced from the right and left video tracks adjacent to the currently reproduced video track and detected in their levels and the relation between the video heads and magnetic tape is controlled so that the reproduction levels of the left and right pilot signals are equal, the video heads always scan the center of each video track so that the crosstalk of video signal can be minimized.

In order to increase the recording density of the video signal being recorded on the magnetic tape, the video signal is often so recorded as to form adjoining video tracks between which no gap is present. In this case, wide video heads are used to form partially overlapped video tracks in such a manner that a second video signal is recorded on a second video track and part of the previous first track on which a first video signal was recorded, and thus at the same time part of the first video signal recorded on the part of the previous track is erased but the second video signal is also recorded on the part. In this way, since part of the recorded signal is erased by the succeeding recording, the actual remaining width of each track is narrower than upon recording. Therefore, the center of the remaining video track in the width direction is deviated from the center part in recording. This deviation of the center in the width direction becomes half of the width of the erased part of the first video track when the second video signal is recorded on the second video track.

In the pilot-system autotracking, upon reproduction the video heads will be controlled to scan each track along the center of its remaining width without no basic devise, and hence to laterally deviate in its center position by half the width $\Delta T$ erased upon recording, or $\Delta T/2$ provided that the video heads of the same width are used upon recording, and reproduction. In addition, the tracking-purpose pilot signals are reproduced as crosstalk components and hence selected to have a low frequency. Thus, part of the previous video track can not be completely erased upon recording of the next track, thus causing the head to scan slightly deviated. As described above, when a so-called wide head is used which is wider than the recorded track pitch, the video head, upon reproduction, scans the same track at a position deviated from the center position along which it scanned upon recording. Since the head is recognized to scan deviated when its center traces the center of the recorded track, it is desirable for the purpose of reducing the level variation of reproduced signal, but it causes the following problems. First, since the deviated condition in which the head scans is caused when the magnetic tape transport and the head scanning are out of phase, the video head starts to scan the tape at different timings upon recording and reproduction. When the video head starts to scan the tape, or when the video head strikes the tape wrapped around the cylinder, the magnetic tape vibrates due to this shock, changing in its travelling speed. It upon reproduction the same shock is added to the magnetic tape at the same time as upon recording, the magnetic tape vibrates similarly, cancelling out the variation of the tape travelling speed upon recording. Thus, even when an audio-recorded track is formed on the tape along its longitudinal direction, no wow and flutter is caused. However, when the shocks are added at different time upon recording and reproduction, the vibrations become out of phase, with the result that the speed variations of the magnetic tape cannot be cancelled out.

Therefore, when there is an audio-recorded track in the longitudinal direction, the amount of wow and flutter is increased. Secondly, when a time-base compressed audio signal is recorded on the excessively wound part of the tape which is wrapped over 180° around the cylinder, a problem is caused upon after-recording.

That is, in this case, after a video signal is recorded on the video tracks, a time-base compressed audio signal is recorded on the extension of the video tracks. When the so-called after-recording is made to record this audio signal upon reproduction of video signal, the audio signal is recorded in deviated condition and hence with a small level, so as to have poor S/N ratio.

That is, since after-recording of audio signal is made under the condition that when the magnetic recording-/reproducing apparatus is in reproduction mode, the video head scans the video track to reproduce a pilot signal for tracking by which the auto-tracking is performed, the audio signal is recorded in the deviated condition directly by the deviated scanning condition of the video head upon reproduction. In other words, the audio signal is recorded in the deviated condition on a recorded pattern, and thus positioned so improperly with respect to the video track as to bring a bad effect upon reproduction.

Thirdly, in the azimuth recording system, a skew is caused by the track formation at incorrect positions. That is, since the center of the video head, upon reproduction, scans a different position from that it scanned upon recording, the horizontal synchronizing signals of video signal reproduced from the adjacent video tracks have different phases, thereby causing skew distortion.

As described above, in the tracking system using pilot signals, it is necessary to scan the tracks at the same position upon recording and reproduction.

Accordingly, it is an object of this invention, to provide a magnetic recording/reproducing apparatus for recording pilot signals for tracking on video tracks to overlap the video signal and for reproducing those signals of which the pilot signals are used for autotracking, wherein the video heads are able to scan the video tracks at the same position upon recording and reproduction.

According to this invention, upon reproduction, when the video heads scan a video track to reproduce signals, the pilot signals on the right and left video tracks adjacent to that scanned track are reproduced and detected in level, and the pilot signal on one of the right and left adjacent tracks is changed in level, so that upon reproduction the video heads scan the same position as upon recording.

The invention will become more readily understood from the following exemplary descriptions taken with the accompanying drawings in which.

Figure 1:
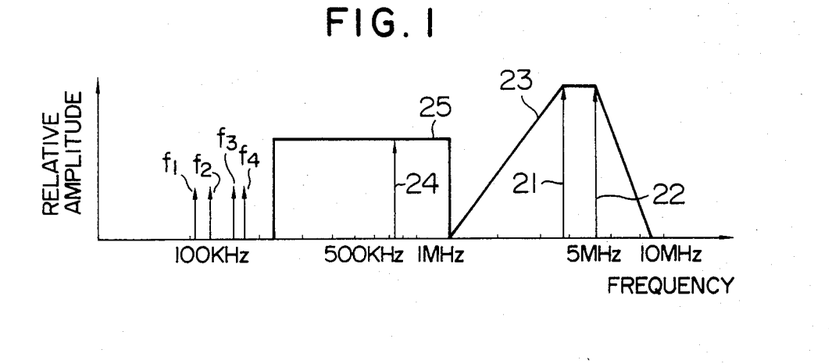
FIG. 1 shows a frequency spectrum of a video signal to be recorded on a magnetic tape by a magnetic recording/reproducing apparatus of this invention.
Figure 2:
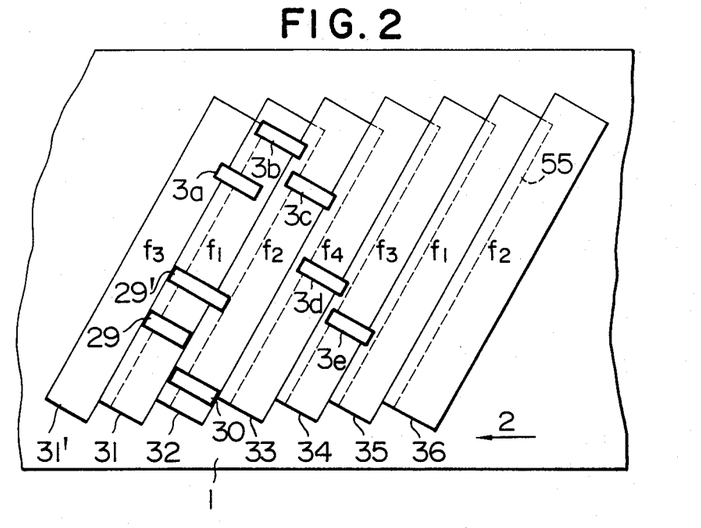
FIG. 2 shows a pattern of the video signal recorded by the magnetic recording/reproducing apparatus.

FIG. 1 shows the frequency spectrum of a video signal recorded on a magnetic tape by a magnetic recording/reproducing apparatus according to this invention. Referring to FIG. 1, there are shown a frequency-modulated luminance signal 23 of a composite color television signal, a carrier signal 21 corresponding to the level at the top of a horizontal synchronizing signal of a luminance signal, another carrier signal 22 corresponding to the white peak level of the luminance signal, a carrier chrominance signal 25 derived from the composite color television signal, and a subcarrier signal 24 of the carrier chrominance signal 25. This subcarrier signal 24 lies in a selected frequency band lower than the lower side band of the luminance signal 23 as a result of frequency convertion. In addition, four pilot signals $f_1$, $f_2$, $f_3$ and $f_4$ are shown which are selected to lie in a frequency band lower than the lower side band of the carrier chrominance signal. These pilot signals $f_1$, $f_2$, $f_3$ and $f_4$, which are each a single different signal, are selected to have frequencies of 6.5 $f_H$ ($f_H$ is the horizontal scanning frequency), 7.5 $f_H$, 9.5 $f_H$ and 10.5 $f_H$, respectively. Also, one of these pilot signals $f_1$, $f_2$, $f_3$ and $f_4$ is selected for each video track upon recording and recorded on that video track together with the luminance signal 23 and chrominance signal 25. FIG. 2 shows a video-track pattern of multiplex video and pilot signals recorded on a magnetic tape. A magnetic recording/reproducing apparatus having two video heads which are alternately switched to record or reproduce signals, will be described with reference to FIG. 2. A first video head 29 scans a magnetic tape 1 to form, or record a first video track 31, a third video track 33, and a fifth video track 35 in turn or scans such tracks in turn to reproduce video signals therefrom. A second video head 30 scans the tape 1 to form a second video track 32, a fourth video track 34 and a sixth video track 36 in turn, or scans such tracks in turn to reproduce video signals therefrom. Upon recording, the first pilot signal $f_1$ is recorded on the first video track 31 which the first video head 29 scans, the second pilot signal $f_2$ on the second video track 32 which the second video head 30 scans, the fourth pilot signal $f_4$ on the third video track 33 which the first video head 29 scans, and the third pilot signal $f_3$ on the fourth video track 34 which the second video head 30 scans. In other words, the first video head 29 is supplied with alternate first and fourth pilot signals $f_1$ and $f_4$, and the second video head 30 with alternate second and third pilot signals $f_2$ and $f_3$. Then, the first second, fouth and third pilot signals $f_1$, $f_2$, $f_4$ and $f_3$ are recorded in this order as the video tracks 31 to 36 on the magnetic tape 1, respectively, followed by the first and second pilot signals $f_1$ and $f_2$ in turn cyclically. Here, the direction in which the magnetic tape 1 travels is indicated by an arrow 2.

Figure 3:
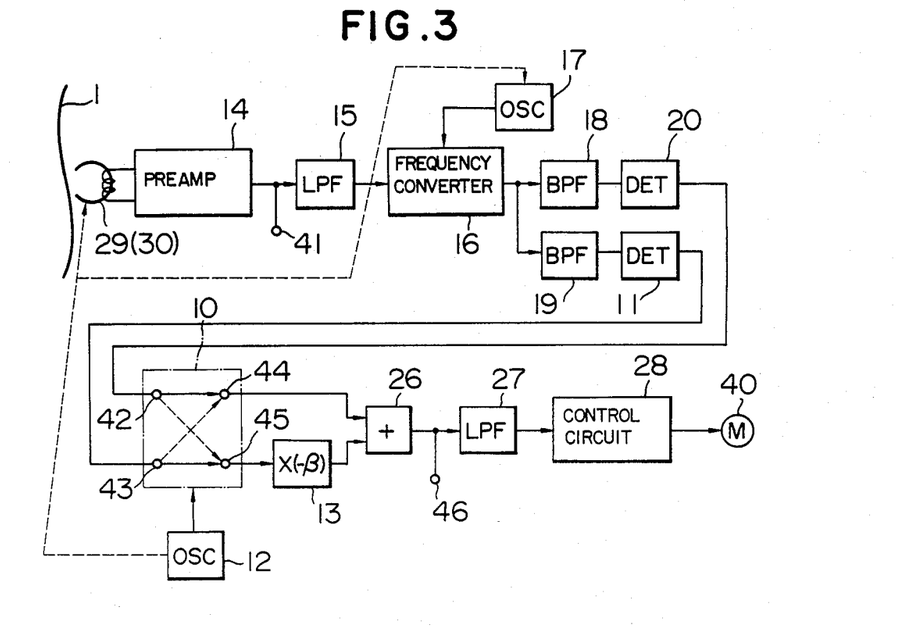
FIG. 3 is a block diagram of a tracking circuit of the magnetic recording/reproducing apparatus of this invention.

FIG. 3 is a block diagram of an auto-tracking circuit of the magnetic recording/reproducing apparatus according to this invention. This auto-tracking circuit serves to control the speed at which the magnetic tape 1 travels upon reproducing the magnetic tape 1 shown in FIG. 2. Although the video head 29 is shown as a single head in FIG. 3 for the sake of convenience, the first and second video heads 29 and 30 are alternately used in practice as shown in FIG. 2. The output of the video head 29 is applied to a preamplifier 14. The output end of the preamplifier 14 is connected to the input end of a low-pass filter 15 and a video signal output end 41. The output end of the low-pass filter 15 is connected to one input end of a frequency converter 16, the other input of which is connected to the output end of a pilot frequency generator 17. The output end of the frequency converter 16 is connected to the input end of a first band-pass filter 18 and to the input end of a second band-pass filter 19. The first band-pass filter 18 has a filtering characteristic for a frequency band with a center frequency of 3 $f_H$, and the second band-pass filter 19 has a filtering characteristic for a frequency band with a center frequency of $f_H$. The output end of the first band-pass filter 18 is connected to the input end of a first envelope detector 20, and the output end of the second band-pass filter 19 to the input end of a second envelope detector 11. The output ends of the first and second envelope detectors 20 and 11 are respectively connected to first and second input ends 42 and 43 of a switching circuit 10, which operates to selectively connect its first and second input ends 42 and 43 to its output ends 44 and 45 alternately in response to the output signal from a head switching signal generator 12. The first output end 44 of the switching circuit 10 is connected to one input end of an adder 26, and the second output end 45 is connected through a level adjuster 13 to the other input end of the adder 26. This level adjuster 13 serves to adjust the level of the signal from the output end 45 of the switching circuit 10 and to invert the phase thereof by 180 degrees. The output end of the adder 26 is connected to the input end of a low-pass filter 27 and to a control signal output end 46. The output end of the low-pass filter 27 is connected to the input end of a capstan motor control circuit 28, the output end of which is connected to a capstan motor 40.

In this auto-tracking circuit, the two video heads 29 and 30 are switched by the output signal from the head switching signal generator 12, i.e., when one video head has reached the top of a track as shown in FIG. 2, the other video head starts to scan the next track. The pilot frequency generator 17 is controlled by the output signal from the head switching signal generator 12 to generate reference signals with the same frequencies as those of the pilot signals in synchronism with the switching of the video heads 29 and 30. The reference signals of frequencies 6.5 $f_H$, 7.5 $f_H$, 10.5 $f_H$ and 9.5 $f_H$ are generated in this order from the pilot frequency generator 17 in synchronism with switching of the video heads. That is, when the first video head 29 scans the first video track 31, a reference signal of 6.5 $f_H$ is produced, when the second video head 30 scans the second video track 32, a reference signal of 7.5 $f_H$ is produced, when the first video head 29 scans the third video track, a reference signal of 10.5 $f_H$ is produced, and when the second video head 30 scans the fourth video track, a reference signal of 9.5 $f_H$ is produced from the generator 17.

The video signal and pilot signal reproduced from the video heads 29 and 30 are applied to and amplified by the preamplifier 14 the output of which is then applied to the low-pass filter 15. The low-pass filter 15 has a cut-off frequency characteristic for passing only the pilot signals of the reproduced signals from the video heads 29 and 30. The pilot signals from the low-pass filter 15 are applied to the frequency converter 16. The luminance signal and chrominance signal of the video signal are applied to a video signal processing circuit via the output end 41. When the video heads 29 and 30 respectively scan the first and second video tracks 31 and 32 in turn as shown in FIG. 2, the pilot signals are reproduced from the video heads 29 and 30 as follows. When the first video head 29 scans the first video track 31, it reproduces, the pilot signal $f_1$ recorded on the first video track 31, and the second and third pilot signals $f_2$ and $f_3$ crosstalked from the second video track 32 and the video track 31' just before the first video track 31. Similarly, when the second video head 30 scans the second video track 32, it reproduces the second pilot signal $f_2$ and the first and fourth pilot signals $f_1$ and $f_4$. When the video heads 29 and 30 respectively scan the third and fourth video tracks in turn, they reproduce not only the pilot signals recorded in the corresponding tracks, but also pilot signals crosstalked from the adjacent tracks. The frequency converter 16 is supplied with the pilot signals reproduced from the video heads and the reference signals produced from the pilot frequency generator 17. Thus, the pilot signals are frequency-converted as a result of mixing with the reference signals, as follows.

(1) When the first video track 31 is reproduced, $f_1 + f_1 = 6.5\ f_H + 6.5\ f_H = 13\ f_H$ $f_1 - f_1 = 0$ $f_2 - f_1 = 7.5\ f_H - 6.5\ f_H = f_H$ $f_2 + f_1 = 7.5\ f_H + 6.5\ f_H = 14\ f_H$ $f_3 - f_1 = 9.5\ f_H - 6.5\ f_H = 3\ f_H$ $f_3 + f_1 = 9.5\ f_H + 6.5\ f_H = 16\ f_H$ (2) When third video track 33 is reproduced, $f_2 + f_2 = 7.5\ f_H + 7.5\ f_H = 15\ f_H$ $f_2 - f_2 = 0$ $f_4 - f_2 = 10.5\ f_H - 7.5\ f_H = 3\ f_H$ $f_4 + f_2 = 10.5\ f_H + 7.5\ f_H = 18\ f_H$ $f_2 - f_1 = 7.5\ f_H - 6.5\ f_H = f_H$ $f_2 + f_1 = 7.5\ f_H + 6.5\ f_H = 14\ f_H$ (3) When the third video track 33 is reproduced, $f_4 + f_4 = 10.5\ f_H + 10.5\ f_H = 21\ f_H$ $f_4 - f_4 = 0$ $f_4 - f_3 = 10.5\ f_H - 9.5\ f_H = f_H$ $f_4 + f_3 = 10.5\ f_H + 9.5\ f_H = 20\ f_H$ $f_4 - f_2 = 10.5\ f_H - 7.5\ f_H = 3\ f_H$ $f_4 + f_2 = 10.5\ f_H + 7.5\ f_H = 18\ f_H$ (4) When the fourth video track 34 is reproduced, $f_3 + f_3 = 9.5\ f_H + 9.5\ f_H = 19\ f_H$ $f_3 - f_3 = 0$ $f_3 - f_1 = 9.5\ f_H - 6.5\ f_H = 3\ f_H$ $$f_3+f_1=9.5\ f_H+6.5\ f_H=16\ f_H$$

$$f_4-f_3=10.5\ f_H-9.5\ f_H=f_H$$

$$f_4+f_3=10.5\ f_H+9.5\ f_H=20\ f_H$$

The first band-pass filter 18 has a cut-off characteristic with center frequency of 3 $f_H$ and thus passes only the pilot signal of 3 $f_H$ of the frequency-converted pilot signal. This pilot signal of 3 $f_H$ from the filter 18 is applied to the first envelope detector 20. The second band-pass filter 19 has a cut-off characteristic with center frequency of $f_H$, and thus passes only the pilot signal of $f_H$, which is then applied to the second envelope detector 11. The first and second detectors 20 and 21 detect their input pilot signals and supply them to the switching circuit 10. The switching circuit 10 is changed in its connecting state by the switching signal from the head switching signal generator 12. That is, when the first video head 29 scans the first, third and fifth video tracks 31, 33 and 35 in turn, the switching circuit 10 is brought to the illustrated connecting state, in which the input end 42 is connected to the output end 44, while the input end 43 is connected to the output end 45. When the second video head 30 scans the second, fourth and sixth video tracks 32, 34 and 36 in turn, the switching circuit 10 is brought to the connecting state opposite to the illustrated one, in which the input end 42 is connected to the output end 45 and the input end 43 is connected to the output end 44. When the first video head 29 reproduces the first video track 31, the output signal from the first detector 20 is applied to the adder 26 through the input end 42 and output end 44 of the switching circuit 10, and the output signal from the second detector 11 is applied through the switching circuit 10 to the level adjuster 13. The level adjuster 13 inverts the phase of the input signal by 180 degrees and supplies it to the adder 26, where the output signals from the first and second detectors 20 and 11 are added. Since the adder 26 is supplied with the signal of the phase reversed by 180 degrees from the level adjuster 13, it operates as a subtracted to produce the difference between the output signals from the first and second detectors 20 and 11. The difference signal is then supplied to the low-pass filter 27, which produces only the low-frequency components thereof and supply them to the capstan motor control circuit 28. This control circuit 28 controls the rotation speed of the capstan motor 40 in response to the signal from the low-pass filter 27. Also, the adder 26 supplies its output via the output end 46 to control the position of the video heads.

When the second video head 30 scans the second video track 32, the switching circuit 10 is changed into its connecting state, and as a result, the output signal from the detector 20 is applied to the level adjuster 13, while the output signal from the detector 11 is supplied directly to the adder 26.

The pilot signal crosstalked from the adjacent track 31' on the left of the first video track 31 when the track 31 is being scanned, appears at the output end of the frequency converter 16 as $(f_3-f_1)$, $(f_3+f_1)$, of which the $(f_3-f_1=3\ f_H)$ pilot signal is passed through the first band-pass filter 18. The pilot signal crosstalked from the adjacent track 32 on the right side thereof is converted by the frequency converter 16 to $(f_2-f_1)$ and, $(f_2+f_1)$, of which the pilot signal of $(f_2-f_1=f_H)$ is passed through the second band-pass filter 19. When the second video head 30 scans the second video track 32, the pilot signal from the first video track 31 is produced from the second band-pass filter 19 as a signal of $(f_2-f_1=f_H)$ and the pilot signal from the third video track 33 is produced from the first band-pass filter 18 as a signal of $(f_4-f_2=3\ f_H)$ That is, the first and second band-pass filters 18 and 19 produce the pilot signals crosstalked from the adjacent tracks on the left and right sides of the scanned track, and then the first and second detectors 20 and 11 detect the levels of the reproduced pilot signals.

When the first and second video heads 29 and 30 scan the first and second video tracks properly as shown in FIG. 2, the reproduction level of the pilot signal crosstalked from the right adjacent track is equal to that of the pilot signal crosstalked from the left adjacent track. Thus, the output signals from the first and second detectors 20 and 11 are equal in their levels, and as a result the output signal from the adder 26 becomes zero, no tracking error signal being produced provided that the level adjuster 13 has gain of 1.

Let it be considered that the travelling speed of the magnetic tape upon reproducing becomes slow as compared with that upon recording. In this case, the video heads 29 and 30 scan extending to the adjacent track as indicated by 3b, 3c, 3d and 3e in FIG. 2. When the first video head 29 scans at position 3b, it reproduces the first pilot signal $f_1$ recorded on the first video track 31, the second pilot signal $f_2$ recorded on the second video track 32 and the pilot signal $f_3$ crosstalked from the video track 31'. In this case, the reproduction level of the second pilot signal $f_2$ reproduced from the second video track $f_2$ becomes larger than that of the third pilot signal $f_3$ crosstalked from the video from the video track 31' because the video head 29 scans part of the second video track 32. Thus, the output signal from the second band-pass filter 19 for the second pilot signal is larger in level than that from the first band-pass filter 18 for the third pilot signal $f_3$ with the result that a level difference is produced between the output levels from the detectors 20 and 11. Therefore, the detected outputs from the detectors 11 and 20 are applied to the adder 26, which then produces the difference voltage between the larger output from the detector 20 and small output from the detector 11. This difference voltage is supplied as a tracking error signal to the control circuit 28. Since the output of the detector 11 is inverted in phase by the level adjuster 13, the polarity of the tracking error signal becomes negative for increasing the rotation speed of the capstan motor 40. When the video head 30 scans at position 3c in FIG. 2, the video head 30 reproduces the second pilot signal $f_2$, the fourth pilot signal $f_4$ and the first pilot signal $f_1$ crosstalked from the first video track. In this case, also the reproduction level of the fourth pilot signal $f_4$ becomes larger than that of the first pilot signal $f_1$. The fourth pilot signal is produced from the band-pass filter 18, and the first pilot signal is produced from the second band-pass filter 19. The first detector 20 supplies its output to the level adjuster 13 via the switching circuit 10 the connection state of which is reversed. Since the output signal from the detector 20 is larger than that from the detector 11, the adder 26 produces a negative tracking error signal as when the first video track is scanned.

Let it be considered that the travelling speed of the magnetic tape 1 upon reproducing is fast as compared with that upon recording. The first and second video heads 29 and 30 sequentially scan the first and second video tracks 31 and 32 as indicated by positions 3a and 3b in FIG. 2, respectively. Similarly, they scan the third and fourth video tracks 33 and 34 as indicated by positions 3c and 3d, respectively.

When the first video head 29 scans the first video track 31 as indicated by position 3a, it produces the third and first pilot signals $f_3$ and $f_1$ and the second pilot signal $f_2$ crosstalked from the second video track 32. In this case, the third pilot signal $f_3$ becomes larger in its reproduction level than the second pilot signal $f_2$. Thus, the output of the first band-pass filter 18 which produces the third pilot signal, and hence the output of the detector 20 become larger than the output of the second band-pass filter 19 which produces the second pilot signal $f_2$ and hence the output of the detector 11, respectively. The output of the first detector 20 is supplied through the switching circuit 10 directly to the adder 26, and the output of the second detector 11 is supplied to the adder 26 through the switching circuit 10 and the level adjuster 13. The adder 26, this time produces a positive tracking error signal, thereby decreasing the rotation speed of the capstan motor 40.

In this way, since the forward or backward deviation of the video heads from their correct scanning tracks is detected upon reproduction and the resulting detected output controls the travelling speed of the magnetic tape, the video heads can always scan the tracks correctly, or can be always controlled to scan the center of each video track.

Figure 4:
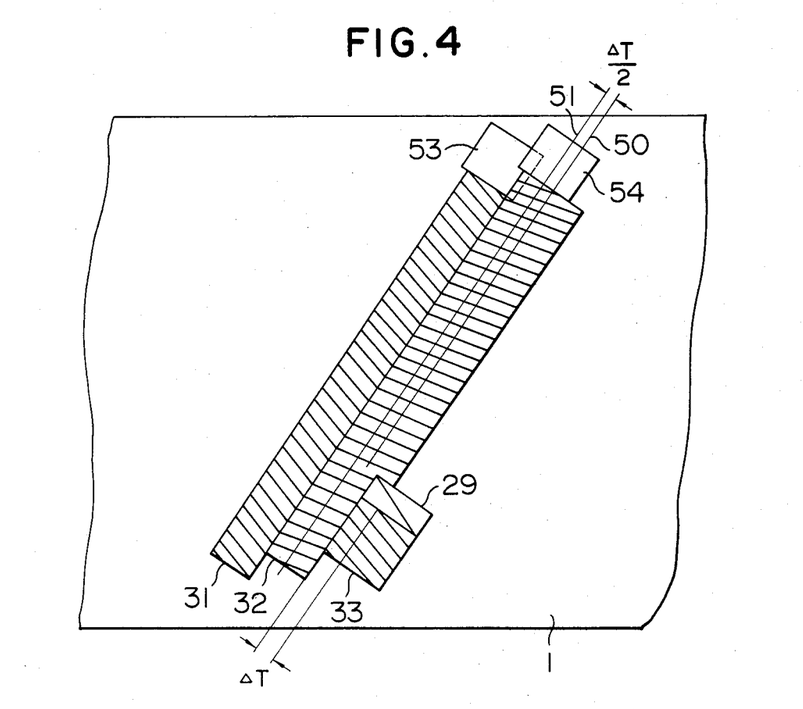
FIG. 4 shows a pattern of overlapped tracks of video signal recorded by the magnetic recording/reproducing apparatus of this invention.

However, when a video signal is recorded by wide video heads on such magnetic recording/reproducing apparatus to form video tracks overlapped on the adjacent tracks, the video heads, upon reproduction, scan diviated positions from the centers of the recorded tracks, which case will be described below with reference to FIG. 4. FIG. 4 shows a pattern of overlapped tracks formed on the magnetic tape. If a video signal and pilot signal are recorded as, for example, the third video track 33 by the first video head 29, the third video track 33 is formed overlapping by width $\Delta T$ on part of the second video track 32 on which the video signal was previously recorded. In this case, the signal previously recorded on the overlapped part, corresponding to the width $\Delta T$, of the second video track 32 is erased and instead the new video signal is recorded thereon. Therefore, although upon recording the second video track 32 was formed by scanning along its center line indicated by 50, upon reproduction it is scanned by head in such a way that the head center traces a center line 51 deviated by $\Delta T/2$ from the line 50. In other words, the center of the head traces different positions upon recording and reproducing. This deviation of the center upon playback causes a problem when an audio signal compressed in time base upon reproduction is recorded on the extension of the video track. In other words, as shown in FIG. 4, when PCM audio signals 53 and 54 are after-recorded on the extensions of the video tracks 31 and 32, the video heads 29 and 30 scan the video tracks 31 and 32 along their center line 51 with the aid of the pilot signals $f_1$ and $f_2$ recorded thereon, and under this condition, the PCM audio signals 53 and 54 are recorded on the ends of the video tracks by the video heads 29 and 30, in which case since the audio signals are also recorded overlapping on the adjacent track, the center of the video track does not coincide with that of the audio signal. This follows that the optimum position of the audio signal track is different from that of the video signal track and therefore the S/N ratio of the audio signal may be decreased even by slight deviation from proper tracking.

Thus, it is necessary that upon reproduction the center of the video head scan the center of the track recorded.

Figure 5:
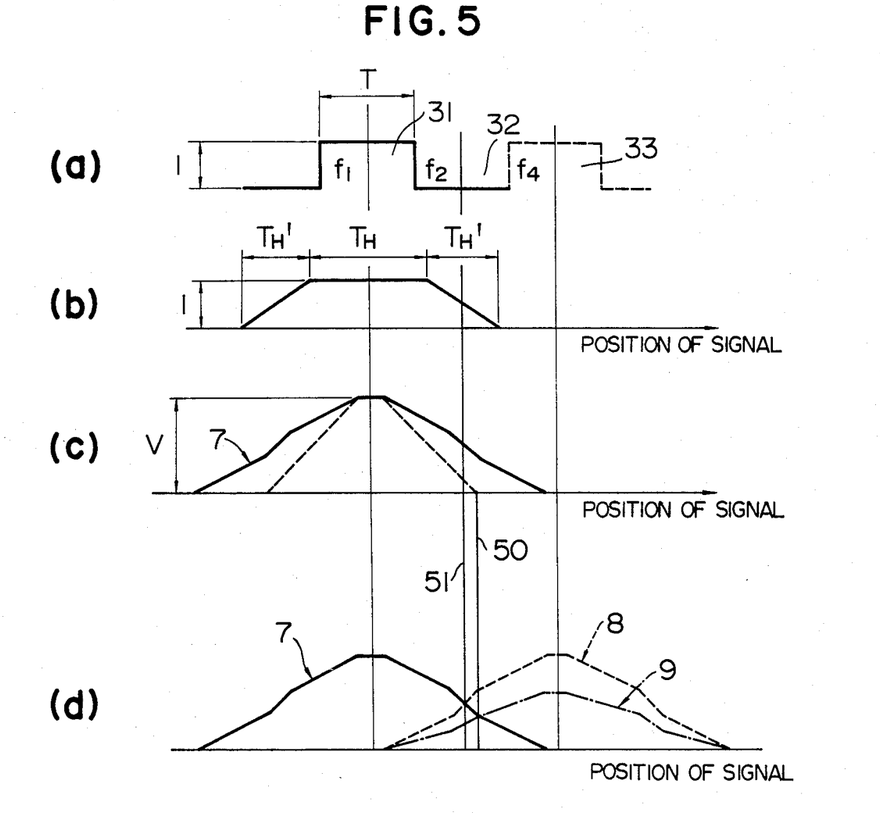
FIG. 5, consisting of (a)-(d), is a waveform diagram showing the output characteristics of the video head upon reproducing the pilot signals.

FIG. 5 is a waveform diagram showing the relation between the position of the pilot signal and the output signal level of video head in the case where the video track is reproduced by wide video heads. The waveform of FIG. 5a shows that for example, the first pilot signal $f_1$ of record level 1 is recorded on the first video track 31, and T in FIG. 5a indicates the width of the video track. FIG. 5b shows the reproducing characteristic of the video head wider than the width T of the video track 31, and $T_H$ in FIG. 5b represents the width of the video head. When the video head 29 of the head width $T_H$ scans to catch a signal, it produces the signal of reproduction level 1, but as the position of the signal becomes distant out of the range of the head width $T_H$, the amplitude of the signal reproduced is decreased. When the pilot signal is out of a limit range $T_H'$ which is a limit within which the video head can reproduce signals, no practical output level can be reproduced. FIG. 5c shows the output of the video head when the video head of the characteristic of FIG. 5b has reproduced the recorded pilot signal shown in FIG. 5a.

The characteristic of FIG. 5c can be obtained by multiplying the characteristics of FIGS. 5a and 5b with each other as functions of position and then integrating with respect to position. The result is a curve which can be approximated to a straight line 7 with small error as shown in FIG. 5c. The broken line in FIG. 5c shows the reproduced luminance signal of video signal. When the second video track is reproduced after the fourth pilot signal $f_4$ is recorded at record level 1 on the third video track 33 and the second pilot signal $f_2$ is recorded in the second video track 32, the first pilot signal $f_1$ recorded on the first video track 31 and the fourth pilot signal $f_4$ recorded on the third video track 33 are reproduced as shown in FIG. 5d. In this case, the waveform of FIG. 5a shows zero-record level second pilot signal $f_2$ on the video track 32. We now assume that the second video track 32 is reproduced. The sum and difference signals of the second pilot signal recorded on the second video track are removed by the first and second low-pass filters 18 and 19 before being supplied to the detectors 11 and 20, and thus the second pilot signal is zero level as shown in FIG. 5a. In practice, the second pilot signal is recorded at record level 1. As shown in FIG. 5c, when the first video track 31 is reproduced, the video head can produce a sufficient amount of pilot signal $f_2$ recorded on the second video track as indicated by the output characteristic 7. Thus, when the second video track 32 is reproduced, the first pilot signal $f_1$ recorded on the first video track 31 is also reproduced according to the characteristic 7 in FIG. 5c. Similarly, the fourth pilot signal $f_4$ recorded on the third track 33 can be reproduced according to a characteristic 8 in FIG. 5d. Thus, when the first pilot signal $f_1$ reproduced according to the characteristic 7 in FIG. 5d is frequency-converted by the frequency converter 16, the pilot signal of $(f_2 - f_1 = f_H)$ is obtained. Also, the pilot signal of $(f_4 - f_2 = 3 f_H)$ can be obtained from the fourth pilot signal $f_4$ reproduced according to the output characteristic 8. In FIG. 3, the capstan motor control circuit 28 controls the speed of the capstan motor 40 so that the output signal from the adder 26 is zero. This means that in FIG. 5, when the second video track 32 is reproduced, the second video head 30 scanning the second video track 32 is controlled to reproduce with the same level the first pilot signal $f_1$ recorded on the first video track 31 and the fourth pilot signal $f_4$ recorded on the third video track 33. That is, the second video head 30 is controlled to scan along the straight line 51 which corresponds to the intersecting point between the output characteristics 7 and 8 as shown in FIG. 5d. This straight line 51 corresponds to the center line on the second video track 32. In order that upon reproduction the second video head 30 scans the recorded second video track 32 along its center line 50, it is necessary to bring the intersecting point between the output characteristics 7 and 8 on the center line 50. Thus, it is necessary to reduce the level of the reproduced fourth pilot signal $f_4$ as shown in FIG. 5d by an output characteristic 9. Alternatively, it is necessary to increase the level of the output characteristic 7. The output characteristics 7 and 8 provide production levels of $T_H'/2$ and $T_H/2$ on the center line 50 in FIG. 5d. Thus, the rate of decreaseing the output characteristic 8 to the output characteristic 9 is $T_H'/T_H$ If $T_H=25$ μm, and $T_H'=15$ μm, then the rate of decrease is 0.6.

In FIG. 3, the fourth pilot signal $f_4$ reproduced from the adjacent video track by the second video head 30 when the second video head 30 is reproducing the second video track 32, is mixed with the reference signal $f_2$ from the pilot frequency generator 17. The mixed output is $(f_4 - f_2 = 3 f_H)$. The pilot $3 f_H$ is detected by the detector 20 through the first low-pass filter 18. The output signal from the detector 20 is applied via the input end 42 and output end 45 of the switching circuit 10 to the level adjuster 13, which operates to decrease the level of the output signal from the detector 20 to $\beta$ times the original signal level. In the example of FIG. 5d, $\beta$ is selected to be 0.6. The level adjuster 13 attenuates the output signal from the detector 20 and at the same time inverts its phase, then supplying it to the adder 26. The adder 26 is also supplied with the output signal from the second detector 11, which corresponds to the output characteristic 7 of FIG. 5d. On the other hand, the output signal from the level adjuster 13 has a level corresponding to the output characteristic 9 and opposite phase. The adder 26 adds both the signals to produce the difference signal, which is supplied to the capstan motor control circuit 28 to control the rotation speed of the capstan motor 40 so that the output of the adder 26 is zero. Thus, the video head 30 scans along the center line 50 in FIG. 5d which the center of the video head traced upon recording.

In this way, since the center of the video head, upon reproduction, can be coincident with the center line on the video track recorded, the video head, upon reproduction, can be made in contact with the magnetic tape at the same timing as upon recording, and the wow and flutter can be reduced. In addition, when a PCM signal is after-recorded on the extension of the video track, the track for the audio signal can be coincident with the video track, thus the S/N ratio of audio signal being improved.

Figure 6:
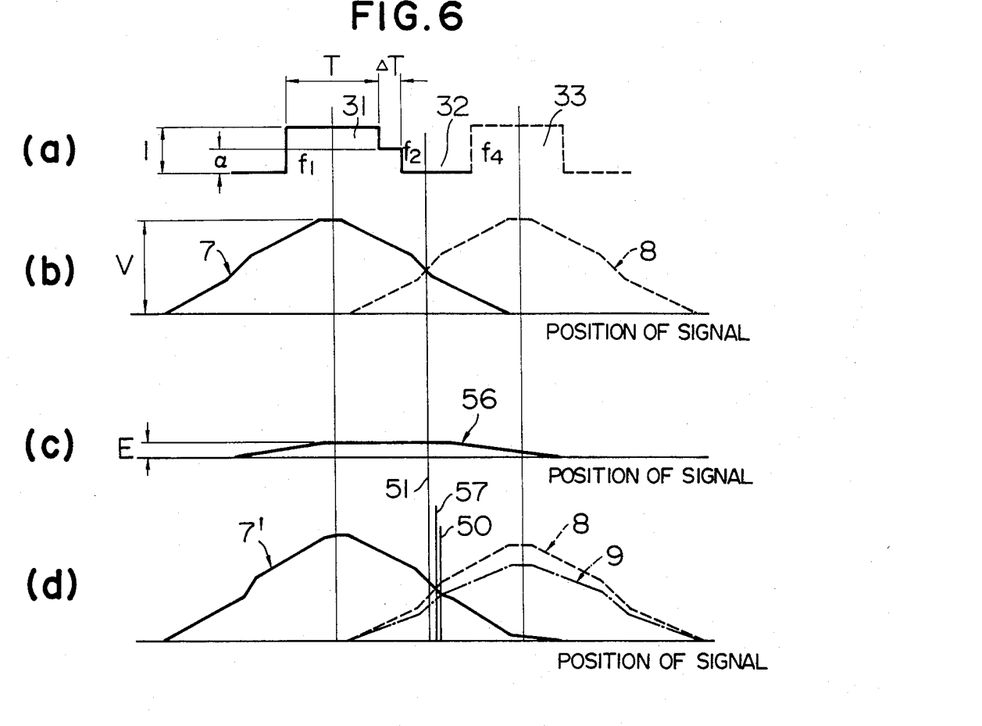
FIG. 6, consisting of (a)-(d), is a waverorm diagram showing the output characteristics of the video head in the case where the pilot signal remains not erased when the video signal is recorded as partially overlapped tracks.

FIG. 6 shows a reproduced output characteristic in the case where when the video and pilot signals are recorded in a superimposed manner, the pilot signal is not erased completely leaving a slight level. Since the frequency of the pilot signal is lower than that of the luminance signal or chrominance signal of video signal, it is recorded deep in the thickness direction of the magnetic tape, and thus the pilot signal is not completely erased when the luminance signal is recorded in a superimposing manner. As a consequence, some pilot signal remains not erased in the overlap-recorded areas on the video tracks as indicated by a broken line 55 in FIG. 2. When some pilot signal remains as mentioned above, the video head produces its output as shown in FIG. 6. In FIG. 6, it is assumed that as in FIG. 5, the second video track 32 is reproduced. When a signal is recorded in the second video track 32, the head also scans part of the first video track 31 corresponding to the width $\Delta T$. At this time only part of the pilot signal $f_1$ remains not erased as shown in FIG. 6a, in which $\Delta T$ is the width of the partial track on which the pilot signal $f_1$ remains, and $\alpha$ is the level of the remaining pilot signal. FIG. 6b is the output characteristic of FIG. 5d. FIG. 6c shows the output characteristic of the video head when it reproduces the remaining pilot signal of level $\alpha$ on the width $\Delta T$. The video head, when reproducing the remaining pilot signal, produces the output 7 shown in FIG. 6b plus the output 56 for the remaining pilot signal as shown in FIG. 6c. This sum output is shown as output 7′ in FIG. 6d. When the pilot signal partially remains not erased, the right-hand side output of the output characteristic 7′ is large. Thus, under this state, the second video track is scanned along a straight line 57 including the intersecting point between the output characteristics 7′ and 8. The line 57 is closer to the center 50 of the video track upon recording than to the center 51 of the video track upon reproduction, but not coincident with the line 50. Thus, the reproduction level of the fourth pilot signal $f_4$ recorded in the third video track 33 is decreased as shown by the output characteristic 9 so that the intersecting point between the output characteristic 7′ and the output characteristic 9 reaches the line 50. Consequently, the position which the center of the video head contacts upon reproduction can be coincident with the position which it contacts upon recording. When the width $\Delta T$ of part of track on which some pilot signal remains not erased, is large, the output characteristic 7′ provides output level $(T_H'/2+E)$ at the intersection with the line 50 and the output characteristic 8 provides output level $T_H/2$ at the intersection with the line 50 as in FIG. 5. Thus, the rate of decreasing the output characteristic 8 to 9 is $(T_H'+2E)/T_H$. If, now, $T_H'=15$ μm, $\Delta T=5$ μm, $\alpha=0.5$, $T_H=25$ μm, then the rate of decreasing the output characteristic 8 is 0.8. Thus, when the magnetic tape with the pilot signal not completely erased, is reproduced, the level adjusting rate $\beta$ of the level adjuster 13 in FIG. 3 is selected to be 0.8, thereby the center of the video head scanning the same position upon reproduction and recording.

While the level adjuster 13 serves as an attenuator and inverter as described above, the level adjuster 13 may serve as only an attenuator and instead a subtracter may be used for the adder and supplied at its subtracting side with the output of the adjuster. Moreover, the level adjuster may have gain of 1 with an amplifier or a DC off-set adding circuit added.

Figure 7:
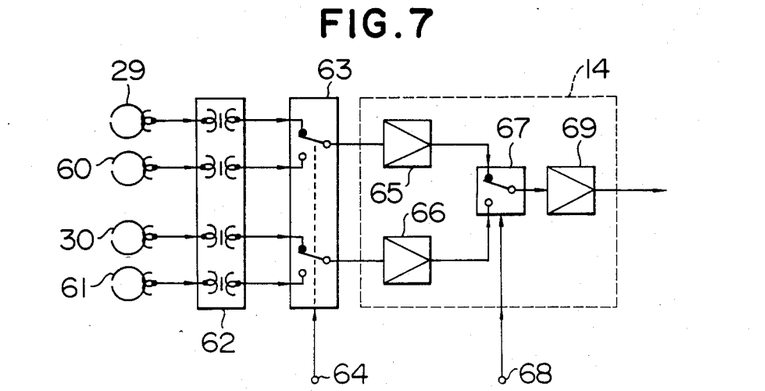
FIG. 7 is a block diagram of one example of a preamplifier in the apparatus of this invention.

FIG. 7 shows a specific example of video heads and preamplifiers used in the magnetic recording/reproducing apparatus according to this invention.

In FIG. 7, third and fourth video heads 60 and 61 are added to the first and second video heads 29 and 30. In home video tape recorders the magnetic tape is transported at a predetermined speed (standard speed) to be recorded or reproduced and sometimes at a speed slower than the standard speed, for a long-time recording or reproduction (hereinafter, called long-time speed). When a video signal is recorded or reproduced at the long-time speed, the video tracks recorded on the magnetic tape are narrower than at the standard speed, and thus the recording density is increased. The third and fourth video heads 60 and 61 are used for long-time playing and have a narrower width than that of the first and second video heads 29 and 30. The four video heads 29, 30, 60 and 61 are connected through four rotary transformers 62 to a switch 63. The switch 63 is changed in state for each of the standard and long-time modes. In the standard speed mode, the first and second video heads 29 and 30 are selected, and in the long-time speed mode, the third and fourth video heads 60 and 61 are selected, when a selecting signal is applied to a control end 64 of the switch 63. The switch 63 is connected to head amplifiers 65 and 66, which amplify the output signals from the video heads 29 and 30, 60 and 61 and supply them to a head switching circuit 67. The head switching circuit 67 is controlled by a head switching signal fed to its control end 68, to switch the outputs from the head amplifiers 65 and 66 for each track, and to produce a continuous video signal, which is then applied to a buffer amplifier 69.

Since when a still picture is reproduced on the magnetic recording/reproducing apparatus, noise appears on the reproduced still picture, the first and second video heads 29 and 30 have different widths in order to reduce this noise as much as possible. For example, the first 29 is selected to be 32 $\mu$m wide, and the second video head 30 to be 28 $\mu$m wide. Similarly, the third video head 60 is selected to be 16 $\mu$m wide and the fourth video head 61 to be 14 $\mu$m wide. The tracking system using pilot signals, as will be understood from the description with reference to FIG. 5, compares the reproduction level of the pilot signal recorded on the adjacent video track to the right of the video track under reproduction with that of the pilot signal recorded on the adjacent video track to the left thereof and controls the tape speed so that the levels are equal. Thus, upon reproduction, to scan the same position as that upon recording, it is necessary to reduce the reproduction level of one of the pilot signals reproduced from the left and right adjacent tracks or amplify the other pilot signal, increasing its reproduction level. Alternatively, the other pilot signal is added with a positive DC voltage to increase its level, or the one pilot signal is added with a negative DC voltage to decrease its level. When the first and second video heads 29 and 30 have different widths, the first and second video heads 29 and 30 reproduce different levels of the pilot signal from, for example, right adjacent video track. Therefore, this should be considered when determining the gain of the attenuator or amplifier.

Figure 8:
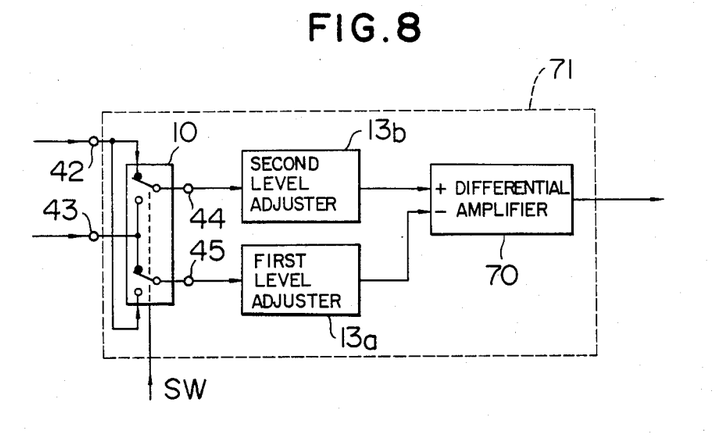
FIG. 8 is a block diagram of a tracking error circuit in the apparatus of this invention.

FIG. 8 is another example of the switching circuit, level adjuster and adder which constitute a tracking error detecting circuit 71. A second level adjuster 13b is connected between the output end 44 of the switching circuit 10 and a differential amplifier 70, and a second level adjuster 13a is connected between the output end 45 and the differential amplifier 70. The differential amplifier 70, which corresponds to the adder 26 in FIG. 3, produces the level difference between the output signals from the first and second level adjusters 13a and 13b, and therefore serves as a subtracter. When the gain of the first level adjuster 13a is 1, the second level adjuster 13b is constructed as an amplifier. When the first level adjuster 13a is operated as an attenuator, the gain of the second level adjuster 13b is 1. The first and second level adjusters 13a and 13b can also be operated as DC off-set adding circuits. When the DC voltage which the first level adjuster 13a adds is zero, the second level adjuster 13b adds a positive DC voltage to the output signal at the output end 44. The DC voltage which the second level adjuster 13b adds is zero, the first level adjuster 13a adds a negative DC voltage to the output signal at the output end 45.

Let it be described to reproduce a magnetic tape on which video tracks are formed at a pitch of 20 $\mu$m by the first and second video heads 29 and 30 32 $\mu$m and 28 $\mu$m wide, respectively. When the first video head 29, in this case 29' reproduces the first video track 31, the pilot signal from the first video head 29 is $(af_3+f_1+bf_2)$. Since the video head 29 overlaps on part of the second video track 32, the reproduction level b of the second pilot signal $f_2$ becomes larger than the reproduction level a of the third pilot signal $f_3$. This level difference $(b-a)$ is proportional to the difference between the width $T_H$ of the video head 29 and the track pitch $T_P$, $T_H-T_P=32-20=12$ $\mu$m. When the second video head 30 scans the second track 32 similarly, the pilot signal reproduced is $(af_1+f_2+b'f_4)$. Since the width $T_H$ of the second video head 30 is narrower than that of the first video head 29, the level b is larger than the level b', but level b' is larger than the level a. The level difference $(b'-a)$ is proportional to the difference between the width $T_H$ and track pitch $P_H$, $28-20=8$ $\mu$m. In order to continue scanning to produce such output, the gains $K_1$ and $K_2$ of the level adjusters 13a and 13b shown in FIG. 8 are selected as:

$$\text{For } K_1 = 1, K_2 \approx (b + b')/2a$$
$$\text{For } K_2 = 1, K_1 \approx 2a/(b + b')$$

where $K_1$ is the gain of the first level adjuster 13a, and $K_2$ is the gain of the second level adjuster 13b. When the level adjusters 13a and 13b are operated as DC off-set adding circuits, the off-set voltage of the first level adjuster 13a is selected to be $\Delta_1$ and that of the second level adjuster 13b to be $\Delta_2$ as follows:

$$\text{For } \Delta_1 = 0, \Delta_2 \approx (b + b')/2 - a$$
$$\text{For } \Delta_2 = 0, \Delta_1 \approx a - (b + b')/2$$

Figure 9:
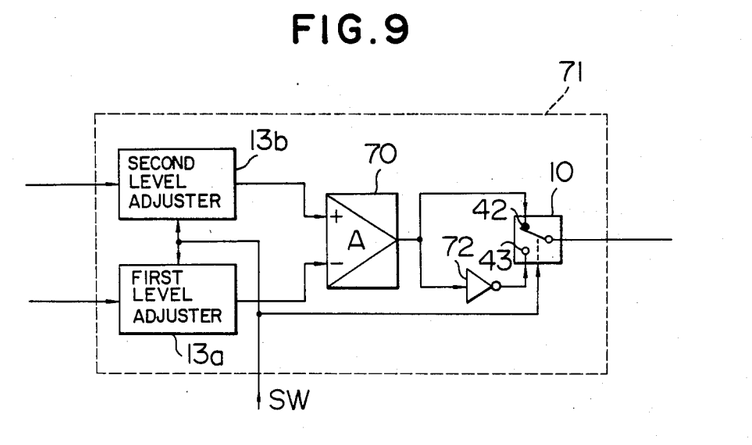
FIG. 9 is a block diagram of another example of the tracking error circuit of the apparatus according to this invention.

FIG. 9 shows still another example of the tracking error detecting circuit. In this example, the switching circuit 10 is connected to the output side of the differential amplifier 70, and an inverter 72 is connected between the output end of the differential amplifier 70 and the input end 43 of the switching circuit 10. The first and second level adjusters 13a and 13b operate as attenuators or DC off-set adding circuits and are controlled by a head switching signal. When the first and second level adjusters 13a and 13b are operated as attenuators, the attenuators are alternately made acitve. That is, when the first level adjuster 13a is operating as an attenuator, the second level adjuster 13b is controlled to have gain of 1. Conversely, when the second level adjuster 13b is operating as an attenuator, the first level adjuster 13a is controlled to have gain of 1. When the first and second level adjusters 13a and 13b are alternately operated as attenuators, the gains $K_1$ and $K_2$ of the attenuators are selected as $$K_1 \div a/b, K_2 \div a/b'$$

When the first and second level adjusters 13a and 13b are operated as DC off-set adding circuits, they are alternately controlled as in the attenuators to add a positive DC voltage, $\Delta_1$, $\Delta_2$ as follows:

$$\Delta_1 \div b' - a, \Delta_2 \div b - a$$

The switching circuit 10 is changed in state by the head switching signal in synchronism with the operation of the level adjusters 13a and 13b, and the inverter 72 inverts the signal supplied to the input and supplies it to the switching circuit 10.

According to this invention, upon reproduction, the video head of video or narrow width is able to scan the same position as that it scanned upon recording.

Thus, even when the audio signal of which the time base is compressed is after-recorded by the video head, the audio signal can be recorded at proper positions.

Also, it is possible to minimize the crosstalk from the right and left adjacent tracks and to improve the picture quality.

What is claimed is:

1. A magnetic recording/reproducing apparatus for sequentially recording each of a plurality of pilot signals of different frequencies on each video track to be multiplexed with a video signal, and sequentially reproducing the recorded video signal and the pilot signals, said apparatus comprising:
    pilot-signal separating means for separating an output signal reproduced by video heads into said video signal and said pilot signals and producing only said pilot signals; first level detecting means for detecting the level of the pilot signal on the right adjacent video track from said pilot signals supplied from said pilot signal separating means;
    second level detecting means for detecting the level of the pilot signal on the left adjacent video track from said pilot signal supplied from said pilot signal separating means;
    subtracting means for subtracting between the output signal from said first level detecting means and the output signal from said second level detecting means so as to produce a tracking control signal;
    first signal supplying means for supplying the output signal from said first level detecting means to said subtracting means;
    second signal supplying means for supplying the output signal from said second level detecting means to said subtracting means; and
    adjusting means for adjusting the level of a signal which at least one of said first and second signal supplying means handles.

2. A magnetic recording/reproducing apparatus for sequentially recording each of four pilot signals of different frequencies on each video track to be multiplexed with a video signal, and sequentially reproducing the recorded video signal and pilot signals, said apparatus comprising:
    pilot signal separating means for separating an output signal reproduced by video heads into said video signal and said pilot signals and producing only said pilot signals, said pilot signals produced from said pilot signal separating means including a first pilot signal recorded on a video track to be reproduced, a second pilot signal recorded on a right adjacent track thereof, and a third pilot signal recorded on the left adjacent track thereof;
    frequency converting means for converting the frequencies of said first, second and third pilot signals by mixing said pilot signals produced from said pilot signal separating means with reference signals;
    first level detecting means for selecting the frequency-converted second pilot signal from the output signals produced from said frequency converting means and detecting the level of the selected signal;
    second level detecting means for selecting the frequency-converted third pilot signal from the output signals produced from said frequency converting means and detecting the level of the selected signal;
    subtracting means for subtracting between the output signal from said first level detecting means and the output signal from said second level detecting means to produce a tracking control signal;
    first signal supplying means for supplying the output signal from said first level detecting means to said subtracting means;
    second signal supplying means for supplying the output signal from said second level detecting means to said subtracting means; and
    adjusting means for adjusting the level of a signal which at least one of said first and second signal supplying means handles.

3. A magnetic recording/reproducing apparatus according to claim 1, wherein said level adjusting means is formed of an attenuator for reducing the level of the pilot signal on the right adjacent video track.

4. A magnetic recording/reproducing apparatus according to claim 1, wherein said level adjusting means is formed of an amplifier for increasing the level of the pilot signal on the left adjacent video track.

* * * * *